R. HUFF.
MOTOR VEHICLE.
APPLICATION FILED AUG. 28, 1907.
1,025,187.
Patented May 7, 1912.
2 SHEETS—SHEET 1.
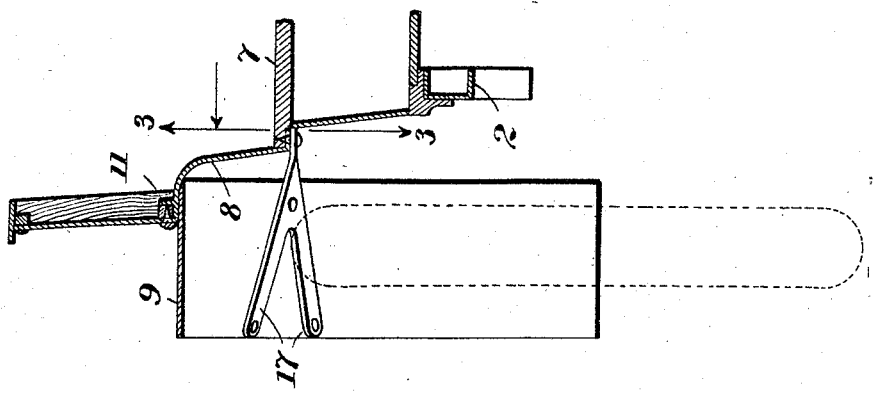
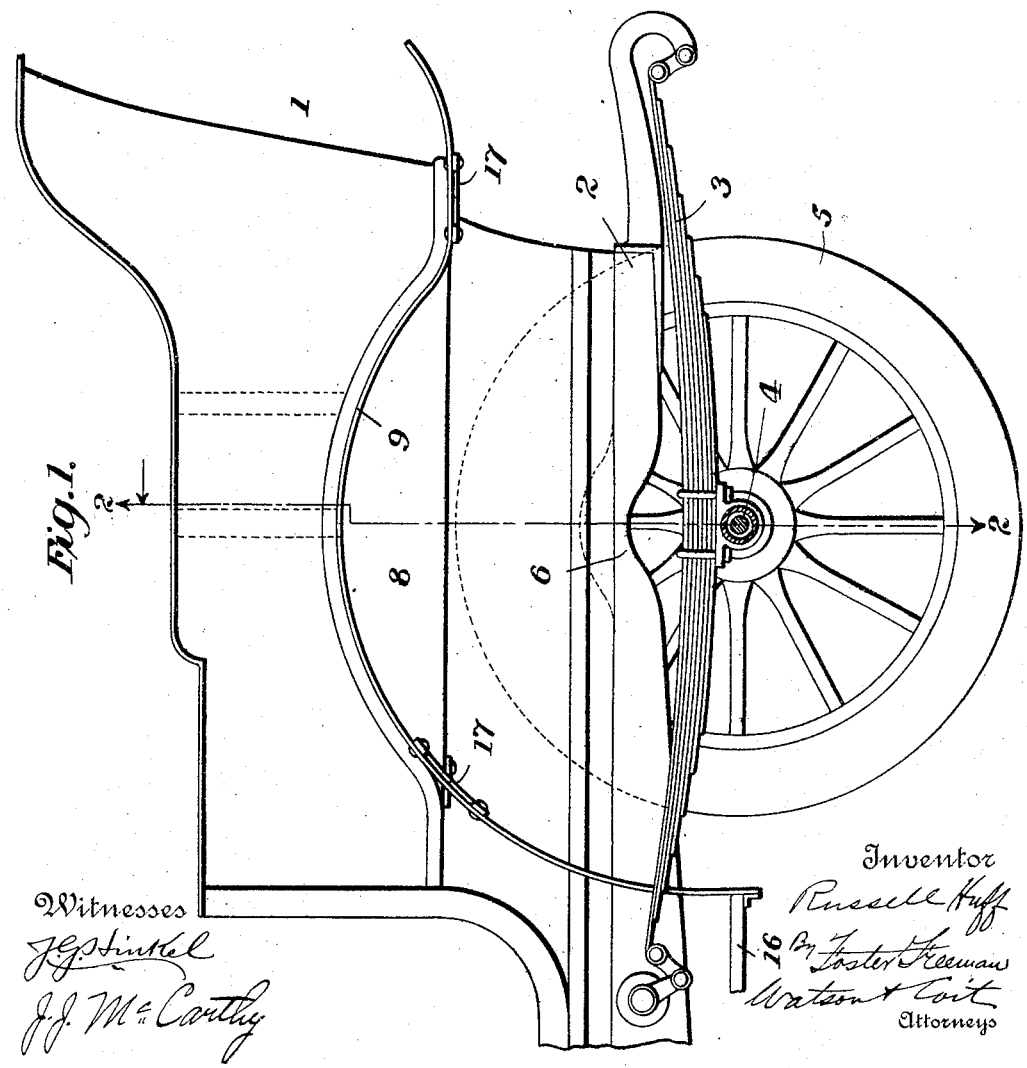

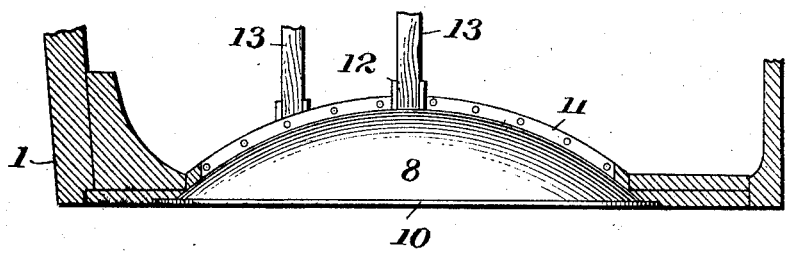
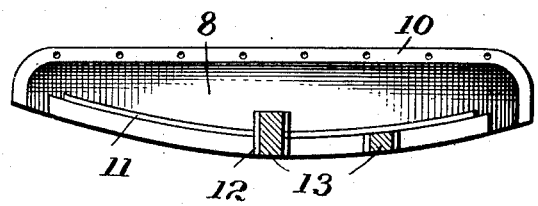
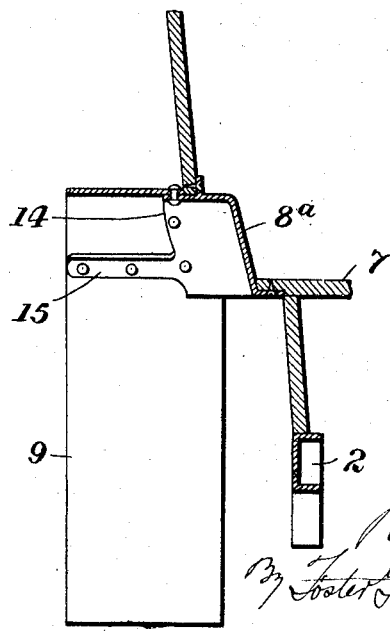

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,025,187. Specification of Letters Patent. Patented May 7, 1912.

Application filed August 28, 1907. Serial No. 390,494.

*To all whom it may concern:*

Be it known that I, RUSSELL HUFF, a citizen of the United States, residing at Detroit, Wayne county, Michigan, have invented certain new and useful Improvements in Motor-Vehicles, of which the following is a specification.

The present invention relates to improvements in the bodies of motor vehicles, and the objects of the invention are to so construct the body that it may be carried lower than heretofore relatively to the rear wheels and axle, while permitting of sufficient vertical movement upon its springs to provide for easy riding and the proper protection of the vehicle.

The invention will be described in detail in connection with the accompanying drawings in which,—

Figure 1 is a left side view of the rear portion of a motor car, the left rear wheel being removed; Fig. 2 is a section on the line 2—2 of Fig. 1; Fig. 3 is a side view of the concave plate shown in Figs. 1 and 2, the view being taken from the line 3—3 in Fig. 2 and in the direction of the arrow; Fig. 4 is a plan view of the plate as shown in Figs. 1 and 2; Fig. 5 is a section similar to Fig. 2 but showing a slightly modified form of the side plate.

Referring to the drawing, 1 indicates the rear part of the body of a motor car, 2 the frame upon which the body rests, 3 the springs which carry the rear part of the frame, 4 the rear axle upon which the springs rest, and 5 the rear wheels. It is desirable in motor car construction to have the body as low as possible, both to facilitate getting into and out of the vehicle and to keep the center of gravity low to prevent swaying in passing around curves, and this must be accomplished without decreasing the radius of the wheels, the tendency being to increase rather than decrease the diameter of the wheels at the present time. With this object in view I have off-set the frame 2 upwardly directly over the axle, as shown at 6 in Fig. 1, and instead of carrying the side of the body in a straight line down to the level of the seat 7, or thereabout, I have cut out the side of the body and inserted a plate 8 which is concave or recessed on its outer side to permit the body to descend so that the upper side of the wheel may pass the level of the seat.

Referring to Figs. 1 to 4, it will be seen that the plate 8 is externally concave, that is, concave or recessed on its outer side, provided with a level or horizontal edge, and with an upper edge which is curved substantially to the curvature of the wheel guard 9. The lower edge is provided with a horizontal flange 10 provided with holes for screws or bolts by which it may be attached to the seat or other part of the body, while the upper edge is provided with a substantially vertical flange 11 which is connected to and supports the side of the body. The plate 8 is preferably cast of aluminum or other suitable metal and lugs 12 may be cast on it to which the vertical parts 13 of the framework may be attached.

As shown in Fig. 5 the plate 8ª is similar to the plate 8 excepting that the upright and horizontal portions meet at an angle instead of being united by a curve as in Fig. 2, and excepting also that the horizontal portion, which is curved longitudinally to the curvature of the wheel guard 9, is provided with a flange 14 to which the wheel guard is connected by rivets or otherwise. Arms 15 for supporting the wheel guard may also be made integral with the plate 8ª. The concave or recessed plates 8 and 8ª not only serve to permit the wheel to rise, but they serve as brackets to stiffen and strengthen the body of the vehicle and to rigidly connect the sides with the lower part of the body. The wheel guard 9 is connected at one end with the step 16 and it may be supported at intermediate points either by connection with the flange of the plate 8ª, as shown in Fig. 5, or by suitable brackets 17, as shown in Figs. 1 and 2.

Having described my invention what I claim and desire to secure by Letters Patent is:

1. In a motor vehicle, the combination with the rear axle and wheels, and the springs supported on said axle, of the body supported on said springs, said body comprising horizontally-elongated externally-concave or recessed metal plates partly extending over said wheels and arranged to permit the body to descend relatively to the said wheels, said plates having straight lower edges and upper edges conforming to the curvature of the wheel guards and having flanges on said edges for attachment to the adjacent parts of the body, substantially as described.

2. In a motor vehicle, the combination with the rear axle and wheels and springs supported on said axle, of the frame having off-set portions over said axle, the body supported on said frame, said body comprising horizontally-elongated externally concave or recessed metal plates partly extending over said wheels, and arranged to permit the body to descend relatively to said wheels, substantially as described.

3. In a motor vehicle, the combination with the rear axle and wheels, and the springs supported on said axle, of the body supported on said springs, said body comprising horizontally-elongated externally concave or recessed metal plates partly extending over said wheels and arranged to permit the body to descend relatively to said wheels, the upper edge of each of said plates conforming substantially to the curvature of the wheel guard and having a vertical flange formed adjacent and parallel to said edge, and transverse parallel lugs for attachment to the adjacent parts of the body.

4. In a vehicle body, a lower panel, an upper panel overhanging the lower panel and having a segmental portion cut away from its overhanging edge, and an externally concave or recessed metal plate at said cut-away edge, said plate having flanges to secure it to the frame of the body.

5. In a vehicle body, a lower panel, an upper panel overhanging the lower panel and having a segmental portion cut away from its overhanging edge, and an externally concave or recessed metal plate at said cut-away edge, said plate having longitudinal and transverse flanges to secure it to the frame of the body.

6. In a motor vehicle, the combination with the rear axle and wheels and the body supported on springs on said axle, said body comprising lower panels wholly inside the wheels and upper panels overhanging the wheels, said upper panels having segmental cut-away portions over the wheels, and horizontally-elongated externally-concave or recessed metal plates filling said cut-away portions and arranged to permit said body to descend relatively to said wheels.

In testimony whereof I affix my signature in presence of two witnesses.

RUSSELL HUFF.

Witnesses:
MILTON TIBBETTS,
CLARA I. DALE.